US012609924B2

(12) United States Patent
Hanwella et al.

(10) Patent No.: US 12,609,924 B2
(45) Date of Patent: Apr. 21, 2026

(54) SYSTEM AND METHOD FOR PRE-STAGED ACCOUNT CREATION WITH 2D CODES BACKGROUND

(71) Applicant: Wells Fargo Bank, N.A., San Francisco, CA (US)

(72) Inventors: Upul D. Hanwella, San Francisco, CA (US); Kimberly R. Nelson, Charlotte, NC (US); Matthew N. Wheeler, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 186 days.

(21) Appl. No.: 18/394,259

(22) Filed: Dec. 22, 2023

(65) Prior Publication Data

US 2025/0211589 A1     Jun. 26, 2025

(51) Int. Cl.
*H04L 9/40*          (2022.01)

(52) U.S. Cl.
CPC ...... *H04L 63/0846* (2013.01); *H04L 63/0492* (2013.01); *H04L 2463/081* (2013.01)

(58) Field of Classification Search
CPC ............. H04L 63/0846; H04L 63/0492; H04L 2463/081; H04L 63/083
See application file for complete search history.

(56) References Cited

U.S. PATENT DOCUMENTS

| | | | |
|---|---|---|---|
| 8,667,568 B2 * | 3/2014 | Schneider | ............... G06F 21/46 713/182 |
| 8,943,320 B2 | 1/2015 | Sabin et al. | |
| 8,984,276 B2 | 3/2015 | Benson et al. | |

(Continued)

FOREIGN PATENT DOCUMENTS

| | | |
|---|---|---|
| CN | 104901967 | 9/2015 |
| CN | 105337741 | 2/2016 |

(Continued)

OTHER PUBLICATIONS

Shah, Jimil, "Verification of the users using QR code in Banking Systems", IJRAR-International Journal of Research and Analytical Reviews (IJRAR) vol. 7. Issue 1 (2020): pp. 848-851, (Mar. 2020), 4 pages.

(Continued)

*Primary Examiner* — Khalid M Almaghayreh
(74) *Attorney, Agent, or Firm* — SCHWEGMAN LUNDBERG & WOESSNER, P.A.

(57) ABSTRACT

A method may include receiving an indication that a user has authenticated at a physical authentication location, the user associated with a user profile and a user identifier; querying a database using the user identifier as input to determine if the user profile has an online user account of an online service; determining, based on the querying, that the user profile does not have an online user account of the online service; based on the determining, generating a 2D barcode encoded with a link to open a credential creation user interface on a computing device; receiving an indication of activation of the link from the computing device; and in response to the receiving, presenting on the computing device the credential creation user interface configured to receive a username and password for a new online user account of the online service.

17 Claims, 4 Drawing Sheets

(56) References Cited

U.S. PATENT DOCUMENTS

| | | | | |
|---|---|---|---|---|
| 9,119,068 | B1 * | 8/2015 | Hubble | H04W 12/06 |
| 9,491,155 | B1 * | 11/2016 | Johansson | G06F 21/604 |
| 9,742,760 | B1 * | 8/2017 | Ou | H04L 63/083 |
| 10,270,774 | B1 * | 4/2019 | Berman | H04W 12/06 |
| 10,320,783 | B1 * | 6/2019 | Buckingham | G06F 21/41 |
| 10,812,483 | B2 * | 10/2020 | Hu | H04L 63/10 |
| 11,038,870 | B2 | 6/2021 | Zhu et al. | |
| 11,212,278 | B1 * | 12/2021 | Buckingham | G06F 21/41 |
| 11,341,386 | B2 | 5/2022 | Stillman et al. | |
| 11,632,655 | B1 | 4/2023 | Pereira et al. | |
| 2012/0203613 | A1 | 8/2012 | Morgan et al. | |
| 2013/0185210 | A1 * | 7/2013 | Dodson | G06Q 20/40 |
| | | | | 705/44 |
| 2014/0380435 | A1 * | 12/2014 | Keeler | H04W 12/06 |
| | | | | 726/4 |
| 2015/0199505 | A1 * | 7/2015 | Jo | H04L 63/083 |
| | | | | 726/4 |
| 2015/0288670 | A1 | 10/2015 | Bhooshan | |
| 2016/0125088 | A1 | 5/2016 | Sheedy | |
| 2016/0219039 | A1 | 7/2016 | Houthooft et al. | |
| 2017/0289813 | A1 * | 10/2017 | Pashkov | H04L 63/083 |
| 2018/0262505 | A1 * | 9/2018 | Ligatti | H04L 63/0853 |
| 2019/0124063 | A1 * | 4/2019 | Cui | H04L 63/083 |
| 2019/0182042 | A1 * | 6/2019 | Ebrahimi | H04L 9/3234 |
| 2020/0244660 | A1 * | 7/2020 | Li | G06F 21/31 |
| 2021/0168606 | A1 * | 6/2021 | Givens | H04W 4/40 |
| 2021/0406868 | A1 | 12/2021 | Brightman et al. | |
| 2023/0035368 | A1 * | 2/2023 | Kim | H04L 67/12 |
| 2024/0291639 | A1 * | 8/2024 | Bakshi | H04L 9/40 |

FOREIGN PATENT DOCUMENTS

| | | |
|---|---|---|
| DE | 202022100352 | 2/2022 |
| IN | 201721014705 | 7/2019 |
| JP | 2007219719 | 8/2007 |
| KR | 20160104244 | 9/2016 |
| TW | 201510884 | 3/2015 |
| WO | 2022160081 | 8/2022 |

OTHER PUBLICATIONS

Shamal, Sonawane, "Secure Authentication for Online Banking Using QR Code", IJETAE-International Journal for Emerging Technology and Advance Engineering. ISSN 2250-2459, ISO 9001:2008 Certified Journal, vol. 4, Issue 3, Mar. 2014., (Mar. 2014), 4 pages.

V, Vall, "How to Make a Contactless QR Code for Registration", [Online]. Retrieved from the Internet: https: www.qrcode-tiger.com qr-code-for-registration, (Jun. 21, 2023), 5 pages.

Wibisono, Yohanes Priadi, "e-Vent Support System for Event Registration", 2019 2nd International Conference on Applied Information Technology and Innovation (ICAITI). IEEE, (09 22 2019), 7 pages.

* cited by examiner

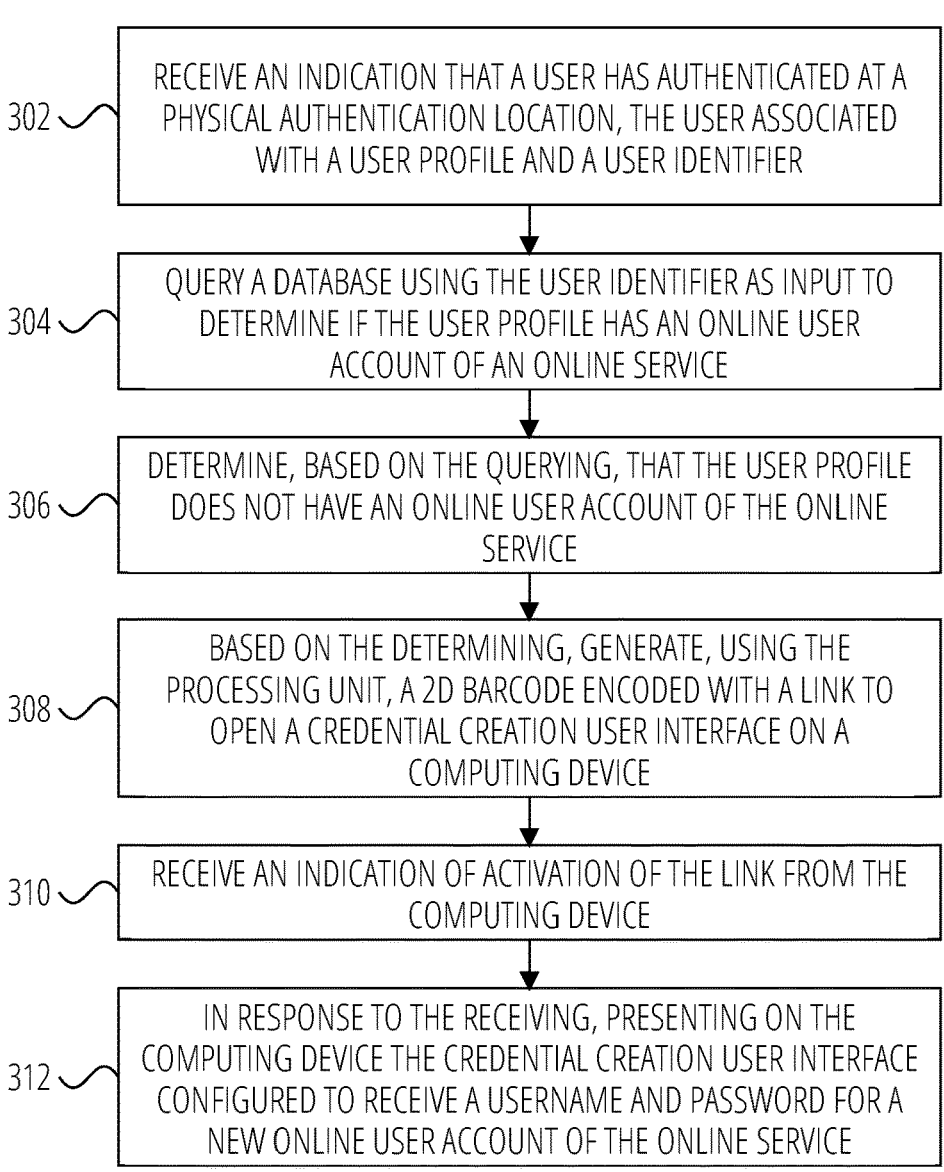

300

302   RECEIVE AN INDICATION THAT A USER HAS AUTHENTICATED AT A PHYSICAL AUTHENTICATION LOCATION, THE USER ASSOCIATED WITH A USER PROFILE AND A USER IDENTIFIER

304   QUERY A DATABASE USING THE USER IDENTIFIER AS INPUT TO DETERMINE IF THE USER PROFILE HAS AN ONLINE USER ACCOUNT OF AN ONLINE SERVICE

306   DETERMINE, BASED ON THE QUERYING, THAT THE USER PROFILE DOES NOT HAVE AN ONLINE USER ACCOUNT OF THE ONLINE SERVICE

308   BASED ON THE DETERMINING, GENERATE, USING THE PROCESSING UNIT, A 2D BARCODE ENCODED WITH A LINK TO OPEN A CREDENTIAL CREATION USER INTERFACE ON A COMPUTING DEVICE

310   RECEIVE AN INDICATION OF ACTIVATION OF THE LINK FROM THE COMPUTING DEVICE

312   IN RESPONSE TO THE RECEIVING, PRESENTING ON THE COMPUTING DEVICE THE CREDENTIAL CREATION USER INTERFACE CONFIGURED TO RECEIVE A USERNAME AND PASSWORD FOR A NEW ONLINE USER ACCOUNT OF THE ONLINE SERVICE

FIG. 3

SYSTEM AND METHOD FOR PRE-STAGED ACCOUNT CREATION WITH 2D CODES BACKGROUND

BACKGROUND

Online services serve many purposes. For example, a user may access online services to connect with a financial institution and transfer money, see their account balances, etc. To access online services the user may need to be enrolled in the online services. Enrolling in online services may be difficult for people with limited technical skills. As a result, many users are unable to use online services.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a flowchart illustrating a method, according to various examples.

DETAILED DESCRIPTION

Figure 1:
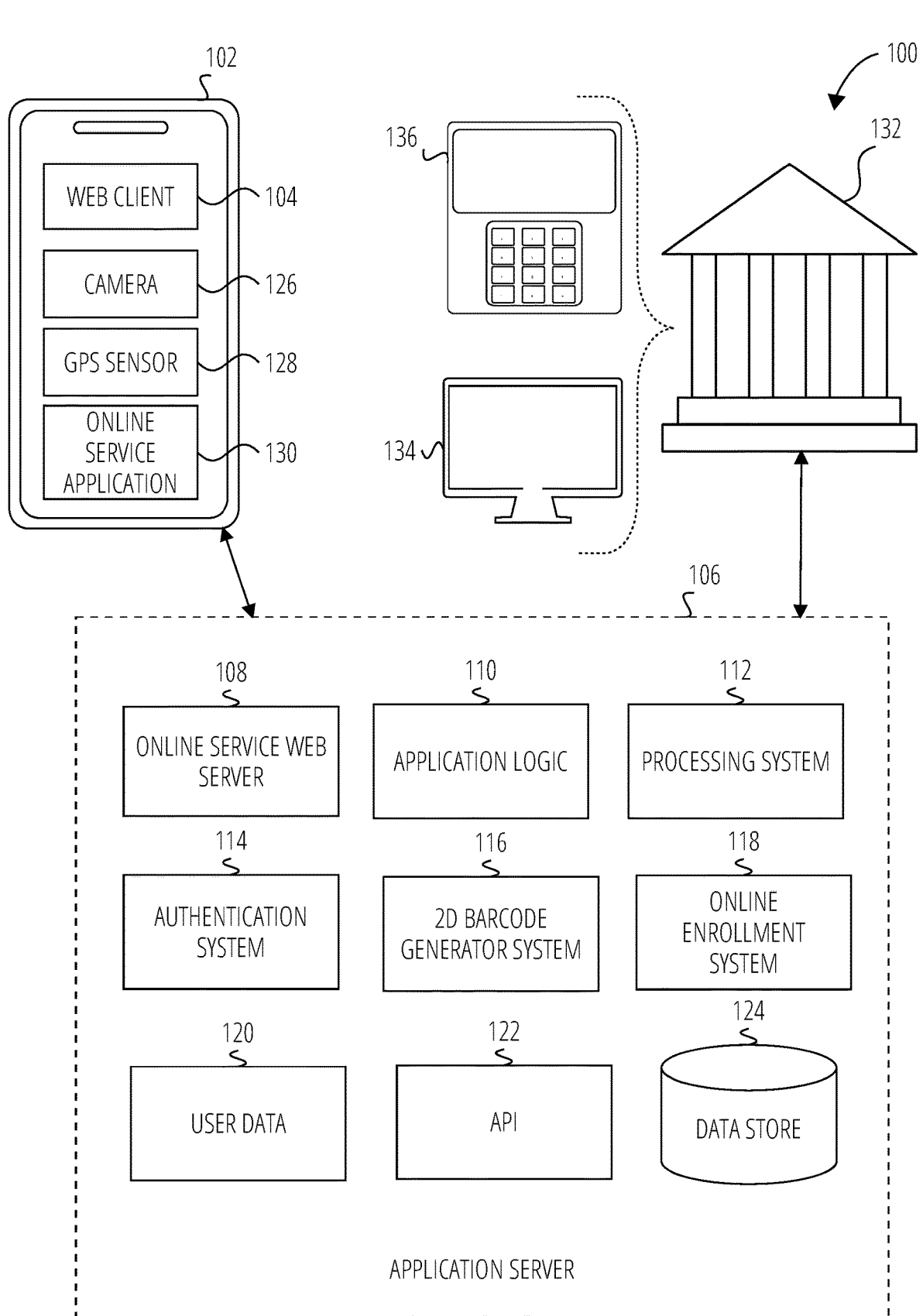
FIG. 1 is a schematic diagram of elements of a user device, an application server, and a physical establishment, according to various examples.

In the following description, numerous specific details are set forth to provide a thorough understanding of some example embodiments. It will be evident, however, to one skilled in the art that the present invention may be practiced without these specific details.

Throughout this disclosure, components may take electronic actions in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have default values should a specific value not be described. User interfaces may be provided for an end-user or administrator to edit the variable values in some instances.

In various examples described herein, user interfaces are described as being presented to a computing device. The presentation may include transmitting data (e.g., a hypertext markup language file) from a first device (such as a web server) to the computing device for rendering on a display device of the computing device via a rendering engine such as a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen simultaneously, in other examples, the portions/elements may be displayed on separate screens such that not all portions/elements are displayed simultaneously. Unless indicated as such, the use of "presenting a user interface" does not infer either one of these options.

Additionally, the elements and portions are sometimes described as being configured for a particular purpose. For example, an input element may be described as configured to receive an input string. In this context, "configured to" may mean presenting a user interface element that can receive user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query to a database.

A user may have an account with a company but still not have access to online services provided by the company. For example, a user may have a bank account with a financial institution, but having a bank account alone may not enable the user to access information about their bank account online. The user may need to complete a separate enrollment process to enroll in the online services.

The online services enrollment process may be completed relatively quickly for people comfortable with technology. However, the process may be overwhelming for users uncomfortable with technology. In addition to technology challenges, some users may not trust entering their initial authentication information. For example, the enrollment process may include downloading an application on their mobile phone and authenticating themselves using a social security number.

Accordingly, described herein are improvements to online enrollment systems that permit enrollment into online services while leveraging in-person identity authentication. For example, a user may enter a physical establishment (e.g., a financial institution branch) to conduct a transaction (e.g., depositing a check). As part of the transaction, the user may authenticate themselves using a pin-pad or present their identification to a bank teller, etc.

During the transaction, a server communicatively coupled with the physical establishment may determine the user is not enrolled in online services. Based on the determination, the server may set up an online account for the user based on their prior authentication in the physical establishment. In addition, a 2D barcode (e.g., quick response (QR) code, data matrix code, Aztec code) may be generated with an encoded URL link to complete the online enrollment process.

The 2D barcode may be presented to the user in the physical establishment (e.g., via a pin pad) and scanned with the user's mobile device. The link may open an application installed on the mobile device and present a user interface to receive a username and password. Notably, the user interface does not require any further authentication from the user. Consequently, users who would not otherwise have been able to—or felt comfortable with—complete the enrollment process now have access to online services through another enrollment path. Because the 2D barcode acts as its own authentication, this disclosure further describes additional security measures to prevent the encoded link from being used by anyone but the user.

FIG. 1 is a schematic diagram 100 of elements of user device 102, application server 106, and physical establishment 132, according to various examples. In FIG. 1, application server 106 includes online service web server 108, application logic 110, processing system 112, authentication system 114, 2D barcode generator system 116, online enrollment system 118, user data 120, application programming interface (API) 122, and data store 124.

User device 102 may be a device a user has on their person when entering physical establishment 132. For example, user device 102 may be a computing device such as a smartphone, tablet, laptop, multi-processor system, microprocessor-based or programmable consumer electronics, or another device a user utilizes to communicate over a network. In FIG. 1, user device 102 includes web client 104 (e.g., SAFARI® web browser or CHROME® web browser), camera 126, GPS sensor 128, and online service application 130 (e.g., one that communicates with online service web server 108).

Physical establishment 132 may be a building or other infrastructure that provides in-person services to its users. For example, physical establishment 132 may be a financial institution branch. Within physical establishment 132 employees of the financial institution may use establishment computing device 134 and authentication device 136 to complete transactions for the user. For example, consider that the user is withdrawing money from their accounts. As part of this process, the employee may ask the user to enter the user's PIN on authentication device 136. A message may then be presented on an establishment computing device 134 display indicating the user has been authenticated, and the employee may complete the transaction. In various examples, authentication system 114 may perform the authentication and transmit the message to establishment computing device 134.

Application server 106 is illustrated with separate elements (e.g., systems, logic). However, the functionality of multiple individual elements may be performed by a single element. Furthermore, the described functionality attributed to the elements of application server 106 may partially or entirely be performed using computing devices within physical establishment 132 (e.g., establishment computing device 134). An element may represent computer program code executable by processing system 112. The program code may be stored on a storage device (e.g., data store 124) and loaded into the memory of the processing system 112 for execution. Portions of the program code may be executed in parallel or serial across multiple processing units in different physical locations and computing systems. A processing unit may be one or more of a core of a general-purpose computer processor, a graphical processing unit, an application-specific integrated circuit, or a tensor processing core operating in a single device or multiple devices. Accordingly, code execution using a processing unit may be performed on a single device or distributed across multiple devices. In some examples, using shared computing infrastructure, the program code may be executed on a cloud platform (e.g., MICROSOFT AZURE® and AMAZON EC2®).

User device 102, establishment computing device 134, and application server 106 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks, or peer-to-peer (e.g., Bluetooth®, WI-FI DIRECT®), or other combinations or permutations of network protocols and network types. The network may include a single Local Area Network (LAN), Wide-Area Network (WAN), or combinations of LANs or WANs, such as the Internet.

In some examples, the communication may occur using an application programming interface (API) such as API 122. An API provides a method for computing processes to exchange data. A web-based API (e.g., API 122) may permit communications between two or more computing devices, such as a client and a server. The API may define a set of HTTP calls according to Representational State Transfer (RESTful) practices. For example, A RESTful API may define various GET, PUT, POST, and DELETE methods to create, replace, update, and delete data stored in a database (e.g., data store 124).

For example, establishment computing device 134 may issue an HTTP PUT or POST API call to online enrollment system 118 via API 122 to determine if an authenticated user has an online service account. The call's request header may indicate the call's contents are formatted in a JSON (JavaScript Object Notation) format. The JSON content may include a user identifier of the authenticated user that corresponds to the user identifier of the user in user data 120. Online enrollment system 118 may respond with a JSON formatted message with a value of "Yes" or "No." API calls are not limited to JSON formats; other formats may be used as one with ordinary skill in the art may recognize.

Application server 106 may include online service web server 108 to enable data exchanges with user device 102 via web client 104. Although generally discussed in the context of delivering webpages via the Hypertext Transfer Protocol (HTTP), other network protocols may be utilized by online service web server 108 (e.g., File Transfer Protocol, Telnet, Secure Shell, etc.). A user may enter a uniform resource identifier (URI) into web client 104 (e.g., the INTERNET EXPLORER® web browser by Microsoft Corporation or SAFARI® web browser by Apple Inc.) that corresponds to the logical location (e.g., an Internet Protocol address) of online service web server 108. In response, online service web server 108 may transmit a web page rendered on a client device's display device (e.g., a mobile phone, desktop computer, etc.).

Additionally, online service web server 108 may enable users to interact with one or more web applications provided in a transmitted web page or via a downloaded application such as online service application 130. A web application may provide user interface (UI) components rendered on a display device of user device 102. The user may interact (e.g., select, move, enter text into) with the UI components, and, based on the interaction, the web application may update one or more portions of the web page. A web application may be executed in whole or in part locally on user device 102. The web application may populate the UI components with data from external or internal sources (e.g., data store 124) in various examples.

In various examples, the web application provides user interfaces and functionality for the online services. For example, the web application may include a regular online services enrollment process, a streamlined online services enrollment process, and functionality for an online user account once a user has enrolled. The web application may be executed according to application logic 110. Application logic 110 may use the various elements of application server 106 to implement the web application. For example, application logic 110 may issue API calls to retrieve or store data from data store 124 and transmit it for display on user device 102. Similarly, data entered by a user into a UI component may be transmitted using API 122 to the online service web server 108. Application logic 110 may use other elements (e.g., Authentication system 114, 2D barcode generator system 116, Online enrollment system 118, etc.) of application server 106 to perform functionality associated with the web application as described further herein.

Data store 124 may store data that is used by application server 106. Data store 124 is depicted as a singular element but may be multiple data stores. The specific storage layout and model used by data store 124 may take several forms—indeed, a data store 124 may utilize multiple models. Data store 124 may be, but is not limited to, a relational database (e.g., SQL), a non-relational database (NoSQL), a flat-file database, an object model, a document details model, a graph database, a distributed ledger (e.g., blockchain), or a file system hierarchy. Data store 124 may store data on one or more storage devices (e.g., a hard disk, random access memory (RAM), etc.). The storage devices may be in standalone arrays, part of one or more servers, and located in one or more geographic areas.

Data structures in data store 124 may be implemented in several manners depending on the programming language of an application or database management system used by an application. For example, if C++ is used, the data structure may be implemented as a struct or class. In the context of a relational database, a data structure may be defined in a schema.

User data 120 may store data associated with customers of a business (such as one affiliated with physical establishment 132). For example, user data 120 may store a database with a user profile table and a user account table. After an initial user enrollment process, a user profile may be generated and stored in the user profile table. In various examples, the initial enrollment process does not need to be completed in an online environment. Thus, a user may physically go to a bank branch to enroll as a customer. To reduce potential confusion between the financial and online services accounts versus the more generic "user account," this disclosure uses the term "user profile" as the primary user account identifying term.

A user identifier may be generated for the user profile. The user identifier may be a unique identifier stored in the user profile table. After enrollment, the user may open accounts associated with the user profile. For example, the user may open a checking account and a savings account. The account may be stored in an accounts table of user data 120. An account may include an account identifier, an account type (e.g., savings), and be associated with a user identifier. If a user has completed an online enrollment process, an online user account may be generated and stored as associated with the user identifier in the accounts table. A current level of authentication may also be stored in the user profile (discussed further below with authentication system 114).

"Associated" in the context of linking an account to a user profile (or other data linkages described herein) may be implemented differently depending on the underlying database system. For example, in a relational database management system (RDBMS), "associated" may refer to the relationship between tables. The relationship could be, for example, one-to-one, one-to-many, or many-to-many, established through foreign/primary key constraints. For example, in a one-to-many relationship, a record in Table A (e.g., the user profile table) may be associated with multiple records in Table B (e.g., a user account table), using a foreign key in Table B that references the primary key in Table A.

Authentication system 114 may track a user's current level of authentication (e.g., none, low, medium, high). The level of authentication may correlate with how sure authentication system 114 is that the user is who they say they are. For example, a user logging into an online service with a username and password without two-factor authentication (2FA) may have a lower level of authentication than when logging in with 2FA. Environmental factors of the login may also influence the level of authentication. A user logging in from a new location (compared to prior logins) may be given a lower level of authentication. The level of authentication may also be dynamic. For example, if a user takes an unexpected action based on a prior behavioral profile (e.g., transferring a large sum of money overseas), the level of authentication may be lowered. Certain actions may require a certain level of authentication. For example, signing up for an online account may require the highest level of authentication.

A user may be authenticated by devices or personnel within physical establishment 132. For example, a user may insert a smart card (e.g., bank card) in authentication device 136 and enter their PIN. In response, a message may be transmitted to authentication system 114 to update the user profile to the level of authentication associated with using the authentication device 136 method of authentication. Similarly, an employee of physical establishment 132 may confirm the user has presented valid identification (e.g., a passport or other government-issued identification). The employee may use (e.g., select a presented input) establishment computing device 134 that transmits a message to authentication system 114 that the user has been authenticated.

When the user is authenticated in person at physical establishment 132, the transmitted message to authentication system 114 may include additional information such as an employee identification (ID) number, a session identifier, and the location (e.g., GPS coordinates or a location identifier that corresponds with a geographic location) of physical establishment 132. The employee ID may be the ID of the employee using establishment computing device 134 within physical establishment 132. The session identifier may be an identifier that is generated when the employee begins a transaction (e.g., opening an account, transferring money, etc.). A session identifier may have a status (e.g., active or completed). For example, after a user has completed their transaction at physical establishment 132, the employee may terminate the session (e.g., click an "end session" button using establishment computing device 134).

2D barcode generator system 116 may be configured to generate a quick response code encoded with a link to a streamlined online services enrollment process provided by the online enrollment system 118. Further details of the 2D-barcode generation process and the streamlined online services enrollment process are discussed in FIG. 2.

Figure 2:
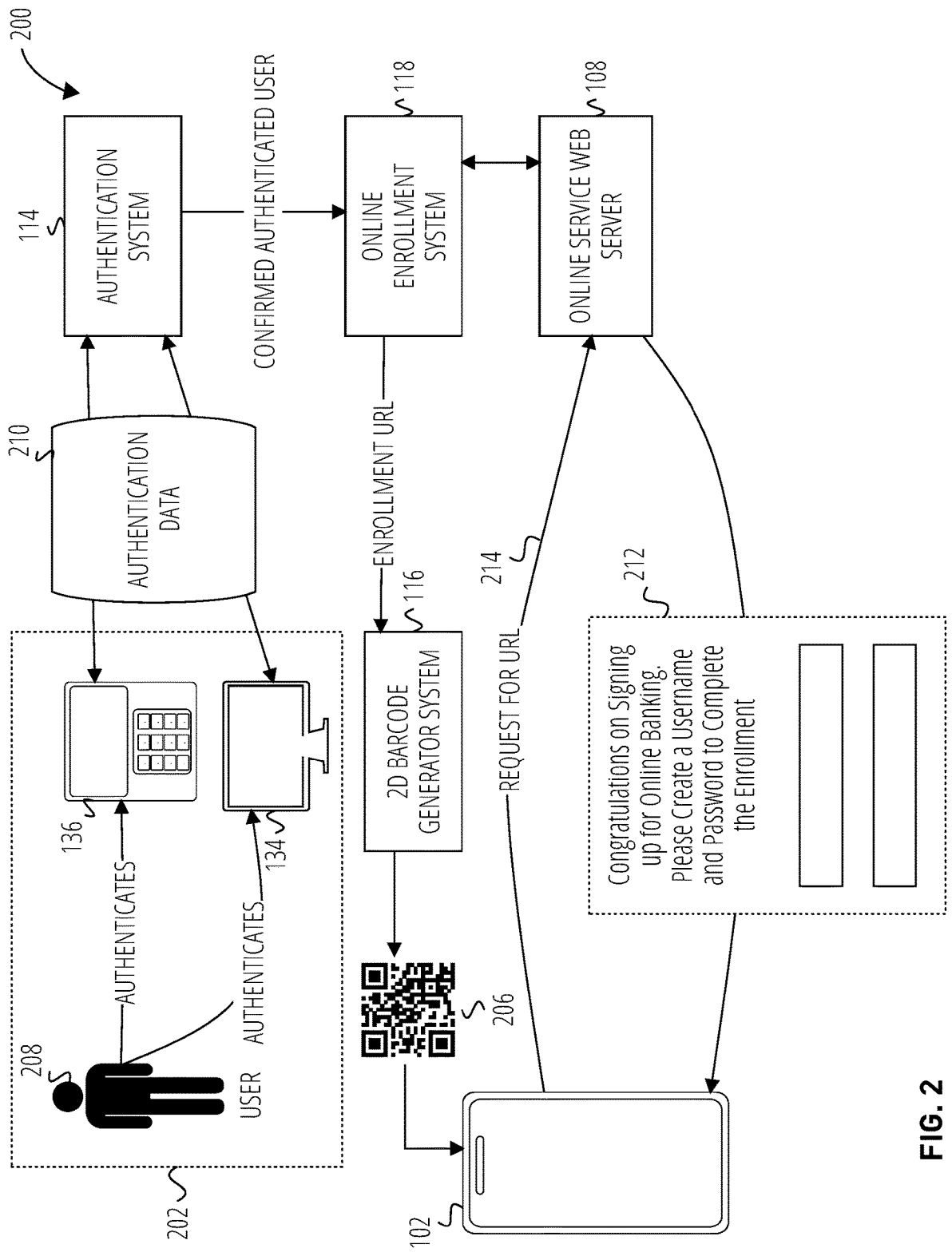
FIG. 2 is a diagram representing an online enrollment process according to various examples.

FIG. 2 is a diagram representing an online enrollment process 200 according to various examples. The diagram includes user 208 in authentication location 202, where they may present or enter identification information using authentication device 136 at a physical establishment such as a bank branch or using an ATM. Authentication device 136 or establishment computing device 134 may transmit authentication data 210 to authentication system 114. Authentication data 210 may include a user identifier, the entered identification information, the location or identifier of the physical establishment, an employee ID of the person helping user 208, and a session identifier.

Authentication data 210 may be transmitted from authentication device 136 or establishment computing device 134 to authentication system 114. Authentication system 114 may authenticate the user based on the received information if needed. For example, a PIN may be checked against the user's PIN as stored in their user profile. Authentication system 114 may also determine a level of authentication based on the user's authentication method, as previously discussed.

Authentication system 114 may also query data store 124 to determine if the user profile is associated with an online user account. If the query results in zero results (e.g., the user does not have an online user account), a message may be transmitted to online enrollment system 118 to begin the streamlined online services enrollment process. The streamlined online services enrollment process does not require the user to authenticate on a webpage, as the authentication has already been completed. Before transmitting the message, authentication system 114 may confirm that the user currently has a sufficient level of authentication required for creating an online user account. For example, authentication system 114 may query data store 124 to determine the current level of authentication for the user and compare it to the level of authentication required for creating an online user account.

Based on the authentication meeting having a sufficient level of authentication, online enrollment systems 118 may create an online user account and store it in a user account table of a database. The online user account may be associated with the user identifier received in authentication data 210. However, the user enters credentials before using the online user account (e.g., a username and password). In various examples, the online user account is not created until after a user has entered in their credentials (e.g. username and password).

A unique credential creation webpage may be generated by online enrollment system 118 for serving from online service web server 108. The unique credential webpage may be associated with a random identifier generated by online enrollment system 118. For example, a URL may end with " . . . website.com/credentials.html?ID=4223134" where 4223134 is the random identifier. Furthermore, the URL may also be stored as associated with the user identifier of the authenticated user in data store 124. Thus, when a request is received for the URL, online service web server 108 may determine the underlying user account to store the entered credentials. Additionally, the URL may be stored with the time the URL was created, an expiration time, the employee ID, the location of authentication location 202, and the session ID.

2D barcode generator system 116 may generate 2D barcode 206 encoded with a unique credential creation webpage URL. In various examples, 2D barcode 206 may encode the URL as part of a deep link URL to an interface of an application installed on user device 102 (e.g., online service application 130). In another example, the encoded URL is an API endpoint provided by online service web server 108 with the random identifier included as a value (e.g., . . . /signup/streamlined/4223134).

The 2D barcode 206 may be transmitted for capture by user device 102 (e.g., using camera 126). The device receiving the transmission may be a separate display at physical establishment 132, establishment computing device 134, or authentication device 136. User 208 may scan the 2D barcode 206 using the user device 102. A 2D barcode decoder on user device 102 may recognize that the encoded information in 2D barcode 206 is a URL and present an option to open the URL.

User 208 may indicate (e.g., click) the option to open the encoded URL. If the encoded URL is a deep link and user device 102 has online service application 130 installed, the unique credential creation webpage may be presented within online service application 130. If online service application

130 is not installed, the unique credential creation webpage may open in a web client such as web client 104. The unique credential creation webpage may include a credential creation user interface 212 configured to receive a username and password for the online user account.

In various examples, before presenting credential creation user interface 212, online service web server 108 performs a security check. The security check may confirm that the location of the computing device that transmitted request 214 is within a threshold distance of authentication location 202. For example, user 208 may have granted online service application 130 or web client 104 access to GPS sensor 128. Or, a location of user device 102 may be inferred from the IP address associated with request 214. The threshold distance may be a variable in online enrollment system 118. For example, if the user device 102 is within 500 feet of the GPS coordinates of physical establishment 132, the location aspect of the security check may be passed.

Another security check may confirm that the time between when 2D barcode 206 was generated and the time request 214 was received is no greater than a stored threshold or past a stored expiration time. For example, the threshold may be 30 seconds. If the threshold has been passed, an error message may be presented on user device 102 indicating the URL link is no longer valid.

Another security check may confirm that the status of the session received as part of authentication data 210 is still active when request 214 is received at online service web server 108. For example, online service web server 108 may transmit a request to the authentication system to determine if the session identifier has been terminated. If the session identifier status indicates it has been terminated, an error message may be presented on user device 102 instead of credential creation user interface 212.

FIG. 3 is a flowchart illustrating a method, according to various examples. The method is a set of blocks describing operations 302 to 312. The method may be embodied in a set of instructions stored in at least one computer-readable storage device of a computing device. A computer-readable storage device excludes transitory signals. In contrast, a signal-bearing medium may include such transitory signals. A machine-readable medium may be a computer-readable storage device or a signal-bearing medium. A processing unit, which, when executing the set of instructions, may configure the processing unit to perform the operations illustrated in FIG. 3. The processing unit may instruct another component of a computing device to carry out the set of instructions. For example, the processing unit may instruct a network device to transmit data to another computing device, or the computing device may provide data over a display interface to present a user interface. In some examples, the method's performance may be split across multiple computing devices using a shared computing infrastructure (e.g., the processing unit encompasses multiple distributed computing devices).

In operation 302, method 300 includes receiving, using a processing unit, an indication that a user has authenticated at a physical authentication location, the user associated with a user profile, and a user identifier. The indication may be an electronic message received at a server such as application server 106. The electronic message may include additional information such as a method of authentication, the user identifier, an employee ID assisting the user, a session ID, and an identification of the physical authentication location (e.g., store or branch identifier).

In various examples, the user is authenticated using a one-time password (OTP), a PIN in combination with a smart card, a government-issued ID, or knowledge-based questions. In various examples, an employee may authenticate the user at the physical authentication location. In various examples, the employee is associated with an employee ID with authorization to authenticate users. The physical authentication location may be a branch location of a business.

In operation 304, method 300 includes querying a database, using the processing unit, and using the user identifier as input to determine if the user profile has an online user account of an online service. In operation 306, method 300 includes determining, based on the querying, that the user profile does not have an online user account for the online service. For example, the user profile may be stored in a user profile table, as discussed previously concerning user data 120. If the user profile is not linked to an online user account, the user profile may be considered not to have an online user account. Accordingly, because the user has been authenticated but does not have an online user account, the streamlined online services enrollment process may be initiated. In various examples, the online service may be a banking online service that allows the user to connect with a financial institution to make operations online, such as transferring money, verifying account balance, etc.

In operation 308, method 300 includes based on the determining, generating, using the processing unit, a 2D barcode encoded with a link to open a credential creation user interface on a computing device. The 2D barcode may be generated as discussed concerning 2D barcode generator system 116. The 2D barcode may be generated at a remote server or the physical authentication location.

Operation 308 may include generating a random identifier and storing the random identifier as associated with the user identifier in a database. For example, a lookup table may link the random identifier with the user identifier. The random identifier may be part of the link encoded in the 2D barcode.

In various examples, before generating the 2D barcode, method 300 may include accessing the user identifier's authentication level. The level of authentication may be determined by querying an authentication system such as authentication system 114. Then, it may be determined that the level of authentication is above a threshold level to create an online user account.

The generated 2D barcode may be displayed at the physical authentication location on a display device. For example, the 2D barcode may be displayed on authentication device 136 or establishment computing device 134. The user may scan the 2D barcode using their computing device (e.g., user device 102). The link encoded in the 2D barcode may be a deep link to launch an application to present the credential creation user interface. If the application is not installed on the user's computing device, activating the link opens a web client and navigates to the link's URL.

In operation 310, method 300 includes receiving, at the processing unit, an indication of activation of the link from the computing device. For example, the user's computing device may transmit a request to open the link, which may be received by online service web server 108.

In operation 312, method 300 includes, in response to the receiving, presenting on the computing device a credential creation user interface configured to receive a username and password for a new online user account of the online service. In various examples, the credential creation user interface includes an option for the user to create a username and a password. Method 300 may include receiving username and password input from the credential creation user interface.

The username and password input may be stored as associated with a newly created online user account for the user.

Security checks may be performed before presenting the credential creation user interface. For example, the 2D barcode may have a time period within which the link to open the application on the computing device may be successfully activated. Once the time period has lapsed, the link may no longer be reached/activated. Accordingly, method 300 may include accessing the expiration time of the link and determining the current time is before the expiration time. In another example, method 300 may include calculating a time difference between the time of generating the 2D barcode and the time of receiving the indication. Then, method 300 may include determining whether the time difference is less than a threshold time difference.

Another security check may use the location of the user's computing device and the location of the physical authentication location. For example, it may be determined that the geographic location of the user's computing device is within a geographic boundary associated with the physical authentication location. Accordingly, method 300 may include accessing a geographic location of the physical authentication location. The geographic location may be determined by querying a lookup table with an identification of the physical authentication location. The geographic location of the user's computing device may be determined (e.g., by an application installed on the computing device, IP location lookup, etc.). Then, the geographic location of the physical authentication location and the geographic location of the computing device may be compared. Method 300 may include, based on the comparison, determining the geographic location of the computing device is within a threshold distance of the geographic location of the physical authentication location.

Another security check may use the session identifier received during the authentication. Method 300 may include determining that there is an active session identifier associated with the user identifier at the authentication location. For example, a query may be made by authentication system 114 to determine if the previously received session identifier has been terminated or is still active.

Figure 4:
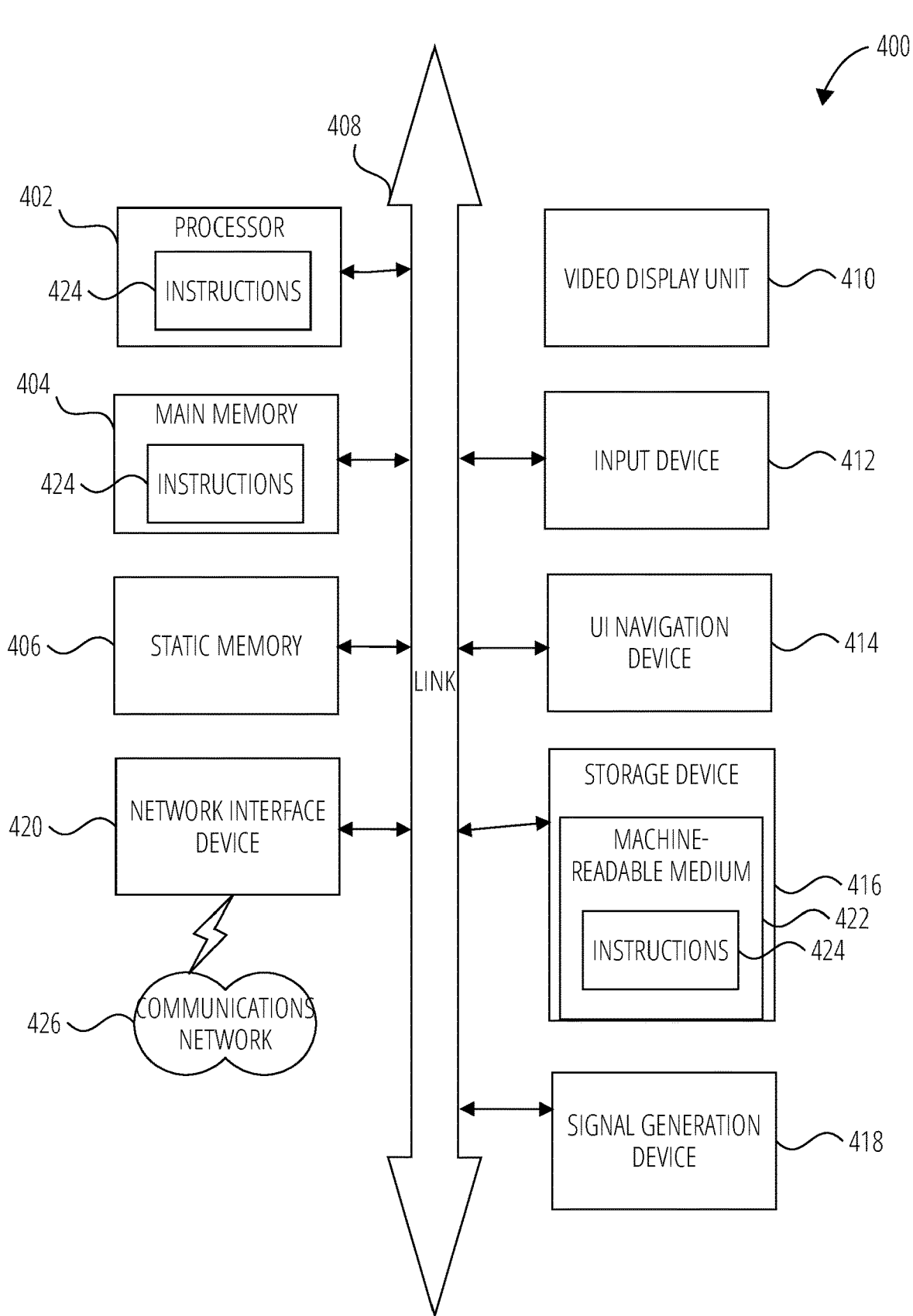
FIG. 4 is a block diagram illustrating a machine in the example form of computer system, within which a set or sequence of instructions may be executed to cause the machine to perform any one of the methodologies discussed herein, according to various examples.

FIG. 4 is a block diagram illustrating a machine in the example form of computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408. The computer system 400 may further include a video display unit 410, an input device 412 (e.g., a keyboard), and a user interface UI navigation device 414 (e.g., a mouse). In one embodiment, the video display unit 410, input device 412, and UI navigation device 414 are incorporated into a single device housing such as a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensors.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 422 that excluded transitory signals.

The instructions 424 may further be transmitted or received over a communications network 426 using a transmission medium via the network interface device 420 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:

receiving, using a processing unit, a confirmation that a user has been authenticated by a physical establishment located at a physical authentication location, the user being associated with a user profile and a user identifier;

querying a database, using the processing unit, using the user identifier as input to determine if the user profile has an online user account of an online service;

determining, based on the querying, that the user profile does not have the online user account of the online service;

based on the determining that the user profile does not have the online user account and the confirmation that the user has been authenticated by the physical establishment, generating, using the processing unit, a two-dimensional (2D) barcode encoded with a link to open a credential creation user interface on a computing device, the credential creation user interface associated with the user identifier;

receiving, at the processing unit, an indication of activation of the link from the computing device;

in response to the receiving, calculating, using the processing unit, a time difference between a 2D barcode generation time and an indication receiving time; and determining the time difference is less than a threshold time difference; and in response to determining the time difference is less than the threshold time difference, presenting on the computing device the credential creation user interface configured to receive a username and a password for creating a credential to access a new online user account of the online service.

2. The method of claim 1, further comprising:

receiving a username input from the credential creation user interface;

receiving a password input from the credential creation user interface;

creating the credential to access the new online user account; and storing the credential as associated with the new online user account.

3. The method of claim 1, further comprising, before presenting the credential creation user interface:

accessing an expiration time of the link; and determining a current time is before the expiration time.

4. The method of claim 1, further comprising, before presenting the credential creation user interface:

accessing a geographic location of the physical authentication location;

determining a computing device geographic location;

comparing the geographic location of the physical authentication location and the computing device geographic location; and based on the comparing, determining the computing device geographic location is within a threshold distance of the geographic location of the physical authentication location.

5. The method of claim 1, further comprising before the presenting on the computing device of the user interface:

determining, using the processing unit, that there is an active session for the user, the active session including an active session identifier.

6. The method of claim 1, further comprising:

prior to the generating, accessing an authentication level of the user identifier; and determining the authentication level is above a threshold level to create the new online user account.

7. The method of claim 1, wherein generating the 2D barcode encoded with the link to open the credential creation user interface on the computing device includes:

generating a random identifier;

storing the random identifier as associated with the user identifier in the database; and including the random identifier in the link.

8. A non-transitory computer-readable medium comprising instructions, which when executed by a processing unit, configure the processing unit to perform operations comprising:

receiving a confirmation that a user has been authenticated by a physical establishment located at a physical authentication location, the user being associated with a user profile and a user identifier;

querying a database using the user identifier as input to determine if the user profile has an online user account of an online service;

determining, based on the querying, that the user profile does not have the online user account of the online service;

based on the determining that the user profile does not have the online user account and the confirmation that the user has been authenticated by the physical establishment, generating a two-dimensional (2D) barcode encoded with a link to open a credential creation user interface on a computing device, the credential creation user interface associated with the user identifier;

receiving an indication of activation of the link from the computing device;

in response to the receiving, calculating a time difference between a 2D barcode generation time and an indication receiving time; and determining the time difference is less than a threshold time difference; and in response to determining the time difference is less than the threshold time difference, presenting on the computing device the credential creation user interface configured to receive a username and a password for creating a credential to access a new online user account of the online service.

9. The non-transitory computer-readable medium of claim 8, wherein the instructions, which when executed by the processing unit, further configure the processing unit to perform operations comprising:

receiving a username input from the credential creation user interface;

receiving a password input from the credential creation user interface;

creating the credential to access the new online user account; and storing the credential as associated with the new online user account.

10. The non-transitory computer-readable medium of claim 8, further comprising, before presenting the credential creation user interface:

accessing an expiration time of the link; and determining a current time is before the expiration time.

11. The non-transitory computer-readable medium of claim 8, wherein the instructions, which when executed by the processing unit, further configure the processing unit to perform operations comprising, before presenting the credential creation user interface:

accessing a geographic location of the physical authentication location;

determining a computing device geographic location;

comparing the geographic location of the physical authentication location and the computing device geographic location; and based on the comparing, determining the computing device geographic location is within a threshold distance of the geographic location of the physical authentication location.

12. The non-transitory computer-readable medium of claim 8, wherein the instructions, which when executed by the processing unit, further configure the processing unit to perform operations comprising, before the presenting on the computing device of the user interface:

determining that there is an active session for the user, the active session including an active session identifier.

13. The non-transitory computer-readable medium of claim 8, wherein the instructions, which when executed by the processing unit, further configure the processing unit to perform operations comprising:

prior to the generating, accessing an authentication level of the user identifier; and determining the authentication level is above a threshold level to create the new online user account.

14. The non-transitory computer-readable medium of claim 8, wherein generating the 2D barcode encoded with the link to open the credential creation user interface on the computing device includes:

generating a random identifier;

storing the random identifier as associated with the user identifier in the database; and including the random identifier in the link.

15. A system comprising:

a processing unit; and a storage device comprising instructions, which when executed by the processing unit, configure the processing unit to perform operations comprising:

receiving a confirmation that a user has been authenticated by a physical establishment at a physical authentication location, the user being associated with a user profile and a user identifier;

querying a database using the user identifier as input to determine if the user profile has an online user account of an online service;

determining, based on the querying, that the user profile does not have the online user account of the online service;

based on the determining that the user profile does not have the online user account and the confirmation that the user has been authenticated by the physical establishment, generating a two-dimensional (2D) barcode encoded with a link to open a credential creation user interface on a computing device;

receiving an indication of activation of the link from the computing device;

in response to the receiving, calculating a time difference between a 2D barcode generation time and an indication receiving time; and determining the time difference is less than a threshold time difference; and in response to determining the time difference is less than the threshold time difference, presenting on the computing device the credential creation user interface configured to receive a username and a password for creating a credential to access a new online user account of the online service.

16. The system of claim 15, wherein the instructions, which when executed by the processing unit, further configure the processing unit to perform operations comprising:

receiving a username input from the credential creation user interface;

receiving a password input from the credential creation user interface;

creating the credential to access the new online user account; and storing the credential as associated with the new online user account.

17. The system of claim 15, wherein the instructions, which when executed by the processing unit, further configure the processing unit to perform operations comprising, before presenting the credential creation user interface:

accessing an expiration time of the link; and determining a current time is before the expiration time.

* * * * *